(12) United States Patent
Almqvist et al.

(10) Patent No.: US 12,479,037 B2
(45) Date of Patent: Nov. 25, 2025

(54) POWER TOOL WITH IMPROVED LIQUID DISPENSING SYSTEM

(71) Applicant: Husqvarna AB, Huskvarna (SE)

(72) Inventors: Torbjörn Almqvist, Gothenburg (SE); Pär Carlsson, Hyssna (SE)

(73) Assignee: HUSQVARNA AB, Huskvarna (SE)

( * ) Notice: Subject to any disclaimer, the term of this patent is extended or adjusted under 35 U.S.C. 154(b) by 687 days.

(21) Appl. No.: 17/295,710

(22) PCT Filed: Oct. 21, 2019

(86) PCT No.: PCT/SE2019/051028
§ 371 (c)(1),
(2) Date: May 20, 2021

(87) PCT Pub. No.: WO2020/111996
PCT Pub. Date: Jun. 4, 2020

(65) Prior Publication Data
US 2021/0387272 A1    Dec. 16, 2021

(30) Foreign Application Priority Data
Nov. 26, 2018   (SE) .................................. 1851456-2

(51) Int. Cl.
*B23D 59/02*     (2006.01)
*B23Q 11/10*     (2006.01)

(52) U.S. Cl.
CPC ........ *B23D 59/025* (2013.01); *B23Q 11/1092* (2013.01)

(58) Field of Classification Search
CPC ........ B23D 59/025; B23D 59/02; B23D 7/02; B23D 57/023; B23D 45/16; B24D 27/08;
(Continued)

(56) References Cited

U.S. PATENT DOCUMENTS 3,896,783 A * 7/1975 Manning ................ B23Q 11/10
                                                          451/450
6,132,301 A    10/2000 Kaiser
(Continued)

FOREIGN PATENT DOCUMENTS

CN    1553847 A    12/2004
CN    1807019 A    7/2006
(Continued)

OTHER PUBLICATIONS

International Search Report and Written Opinion for International Application No. PCT/SE2019/051028 mailed on Jan. 17, 2020.
(Continued)

*Primary Examiner* — Ghassem Alie (74) *Attorney, Agent, or Firm* — Burr & Forman (57) ABSTRACT

A power tool may include a body arranged to support a rotatable work tool. The body may include a front handle and a rear handle. The front handle may be arranged between the rotatable work tool and the rear handle. The power tool may further include a liquid dispensing system for adding a controlled amount of liquid to the rotatable work tool. The liquid dispensing system may include a valve for adjusting a flow of liquid in the liquid dispensing system. The valve may include a control member arranged on a portion of the body separate from the front handle but adjacent to the front handle such that the control member is operable by a hand gripping the front handle.

17 Claims, 6 Drawing Sheets

(58) Field of Classification Search
CPC ......... B24B 23/02; B24B 27/08; B24B 55/02;
B28D 7/02; B28D 1/082; B28D 1/045;
B23Q 11/1092; B23Q 11/10
USPC ...... 30/169, 123.3, 276, 370, 374, 375, 377,
30/388; 125/13.01, 12, 14
See application file for complete search history.

(56) References Cited

U.S. PATENT DOCUMENTS

| | | | | |
|---|---|---|---|---|
| 6,336,273 | B1 * | 1/2002 | Nilsson | B24B 27/08 |
| | | | | 30/389 |
| 6,591,826 | B1 * | 7/2003 | Donnerdal | B23Q 11/10 |
| | | | | 451/344 |
| 6,916,236 | B2 * | 7/2005 | Terpstra | B28D 7/02 |
| | | | | 451/358 |
| 7,713,111 | B2 * | 5/2010 | Layher | B24B 55/02 |
| | | | | 451/450 |
| 7,967,391 | B1 * | 6/2011 | Dalley | B28D 7/02 |
| | | | | 299/39.3 |
| D644,081 | S * | 8/2011 | Rettenweber | D8/66 |
| 8,062,100 | B2 | 11/2011 | Layher et al. | |
| 9,221,111 | B2 | 12/2015 | Elfner et al. | |
| 10,711,913 | B2 * | 7/2020 | Schneider | B24B 55/02 |
| 2006/0260453 | A1 * | 11/2006 | Layher | F16K 7/065 |
| | | | | 137/560 |
| 2007/0107236 | A1 | 5/2007 | Uhl | |
| 2007/0240313 | A1 | 10/2007 | Layher et al. | |
| 2010/0251867 | A1 * | 10/2010 | Shao | B23D 59/02 |
| | | | | 83/171 |
| 2012/0017446 | A1 * | 1/2012 | Strohmeier | B23D 27/02 |
| | | | | 30/233 |
| 2014/0215838 | A1 * | 8/2014 | Bergquist | B25F 5/02 |
| | | | | 30/381 |
| 2015/0367432 | A1 * | 12/2015 | Karlsson | B23D 45/16 |
| | | | | 222/191 |
| 2017/0120436 | A1 * | 5/2017 | Rudolph | B23D 45/16 |

FOREIGN PATENT DOCUMENTS

| | | | | |
|---|---|---|---|---|
| CN | 1951633 | A | 4/2007 | |
| CN | 101293328 | A | 10/2008 | |
| CN | 103781604 | A | 5/2014 | |
| CN | 211889223 | U * | 11/2020 | B23D 45/16 |
| DE | 19828885 | A1 * | 1/1999 | B23D 59/02 |
| GB | 2352997 | A | 2/2001 | |
| GB | 2424689 | A | 10/2006 | |
| JP | S5220795 | Y2 | 5/1977 | |
| WO | 0037215 | A1 | 6/2000 | |
| WO | 2004087389 | A1 | 10/2004 | |

OTHER PUBLICATIONS

Office Action and Search Report for Swedish Application No. 1851456-2 mailed on May 15, 2019.

* cited by examiner

POWER TOOL WITH IMPROVED LIQUID DISPENSING SYSTEM

TECHNICAL FIELD

The present disclosure relates to power tools such as cut-off saws, abrasive chainsaws, ring saws, hole saws, drills, and other rotatable work tools. There are disclosed systems and methods for adding a controlled amount of liquid, such as water, to the rotatable work tool.

BACKGROUND

Dust is often generated when cutting concrete, stone, and other hard materials using a power tool. Such air-borne dust can be harmful to an operator and often necessitates extensive cleaning of the workplace after cutting. It is therefore desired to minimize the amount of air-borne dust. Water or other liquids can be added to the cutting tool during the cutting operation to bind the airborne dust. This makes the cutting environment less harmful to the operator, and also prevents the airborne dust from spreading over a large area.

Different materials produce different amounts of dust when cut, and material sizes differ. It is therefore often desired to add the liquid in a controlled amount depending on cutting scenario. Some cutting environments are also less sensitive to water than others and can tolerate a larger quantity of water spillage.

It is known to arrange a liquid dispensing system on a power tool in order to reduce the amount of generated dust; U.S. Pat. No. 9,221,111 B2 discloses a hand-guided power tool arranged to add water to a rotatable work tool during operation. The water dispensing system is controllable by means of a valve arranged adjacent to a rear handle of the power tool.

U.S. Pat. No. 9,604,297 B2 discloses another liquid dispensing system for adding a controlled amount of liquid to a rotatable work tool. There is described a valve for controlling the added amount of liquid, which valve is attached to a front handle of the work tool.

There is a need for robust power tools with improved liquid dispensing systems that can be easily controlled during operation.

SUMMARY

It is an object of the present disclosure to provide power tools having improved liquid dispensing systems, and methods for operating such power tools.

This object is obtained by a power tool comprising a body arranged to support a rotatable work tool. The body comprises a front handle and a rear handle. The front handle is arranged between the rotatable work tool and the rear handle in an extension direction of the power tool. The power tool comprises a liquid dispensing system for adding a controlled amount of liquid to the rotatable work tool. The liquid dispensing system comprises a valve for adjusting a flow of liquid in the liquid dispensing system, wherein the valve is configured to be controlled by a control member arranged on the body and adjacent to the front handle such that the control member is operable by a hand gripping the front handle.

This way the flow of liquid can be controlled during a cutting operation, since the control member is operable, i.e., reachable, by a hand gripping the front handle. This means that an operator need not let go of any handle in order to adjust liquid flow, which is an advantage.

The control member is arranged on the body, not on the front handle, and therefore does not take up space on the front handle, which is an advantage. The control member is also protected from impacts by external objects such as debris by the front handle, since it is arranged on the body adjacent to the front handle and not on the front handle which is a more exposed location on the power tool.

The design furthermore allows for integrating the valve in the body, which is an advantage since the valve is then protected by the body.

According to aspects, the control member is arranged adjacent to the front handle in direction of the rear handle and away from the work tool. By placing the control member behind the front handle and away from the work tool, the control member is protected by the front handle from impacts by any debris resulting from the cutting operation. The control member is also shielded by the front handle from impacts by external objects.

According to aspects, the control member is arranged in front of the front handle in direction of the rotatable tool. This placement may be advantageous if space behind the front handle is limited. It is an advantage that the general valve concept allows for different placements in relation to the front handle.

According to aspects, the control member is arranged on a right-hand side of the body seen from the rear handle. This placement allows for convenient thumb action by a left hand holding the front handle, which is a preferred mode of holding many power tools comprising front and rear handles arranged along an extension direction of the power tool.

According to aspects, an indicator arrangement is arranged in connection to the valve. The indicator arrangement is configured to indicate a current flow level of liquid in the dispensing system. The indicator arrangement allows for a more efficient tuning of the flow in the liquid dispensing system. Also, an operator can revert to a previously set flow, which saves time.

According to aspects, the control member is a lever configured to be operated by a thumb action. The lever is a low-cost, yet effective control means for controlling the state of the valve. A lever is particularly suitable for control by a thumb action, which is an advantage.

According to aspects, the lever is pivotably arranged around an axis extending essentially orthogonally with respect to an extension direction of the power tool, and essentially parallel to a rotation axis of the rotatable work tool. This arrangement allows for a more convenient thumb action compared to some other arrangements of the lever.

According to aspects, the valve is an electrical valve, and the control member comprises one or more buttons arranged to control the electrical valve. This electrical control arrangement may offer a more convenient control of the valve. Also, the buttons may be configured such that an operator can select one or more stored configurations optimized for different cutting scenarios, which is an advantage.

According to aspects, the valve portion is arranged dismantable in the through hole, such that the valve can be dismantled without disassembling other parts of the body. It is an advantage to be able to remove the valve for cleaning and inspection without dismantling other parts of the body.

There is also disclosed herein methods for controlling an amount of liquid added to a rotatable work tool during operation of a power tool. The methods are associated with the same advantages as the above-mentioned power tools.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described more in detail with reference to the appended drawings, where.

DETAILED DESCRIPTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

The liquid dispensing systems and techniques disclosed herein are applicable to a wide range of power tools where it can be beneficial to add liquid to the work tool during a cutting or abrasive procedure. The techniques are mainly exemplified using cut-off saws but are equally applicable for two-handed power tools comprising abrasive chains, and also to, e.g., drills, hole saws, and ring saws.

The disclosed techniques are equally applicable to combustion engine powered tools, battery powered tools, and hybrid electric/combustion powered tools.

Power tools are often two-handed tools, comprising a front and a rear handle. Commonly, an operator holds the power tool by the rear handle using a right hand, and by the front handle using a left hand.

Power tools often comprise liquid dispensing systems for adding liquid to the work tool during a cutting operation. An operator may want to control the amount of liquid added to the work tool, i.e., to adjust a flow level of liquid through the liquid dispensing system. The operator may, e.g., observe that an excessive amount of airborne dust is being generated, whereupon he may wish to increase the flow of liquid.

U.S. Pat. No. 9,221,111 B2 discloses a hand-guided power tool with a water dispensing system that is controllable by means of a valve arranged adjacent to a rear handle of the power tool. To operate this valve the operator needs to let go of the rear handle which is unadvisable during operation. The operator therefore needs to cease cutting operation to adjust the flow of liquid, which is a disadvantage.

U.S. Pat. No. 9,604,297 B2 discloses a hand-guided power tool with a liquid dispensing system that can be controlled during cutting operation. This is because the liquid dispensing system comprises a control member arranged on the front handle of the power tool, where it can be operated without letting go of any of the rear or front handles. Thus, the flow of liquid can be adjusted during operation of the power tool, which is an advantage. However, the control member takes up some space on the front handle, which prevents an operator from using the whole front handle length during the cutting operation, which may be a disadvantage in some scenarios. Also, the control member is somewhat exposed on the front handle, where it may be damaged by impacts from external objects.

The present disclosure presents an improved liquid dispensing system which can be conveniently operated by a hand gripping the front handle and which does not take up space on the front handle. The solution is mechanically robust since the flow control means is arranged at least partly shielded by the front handle.

Figure 1A:
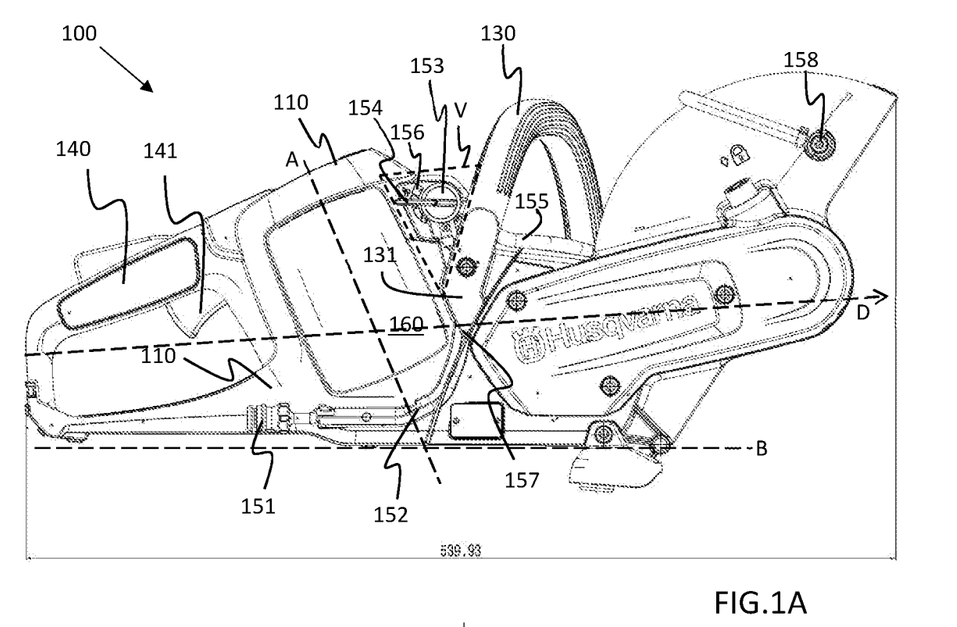
FIGS. 1A-1D schematically show a power tool with a liquid dispensing system.
Figure 1B:
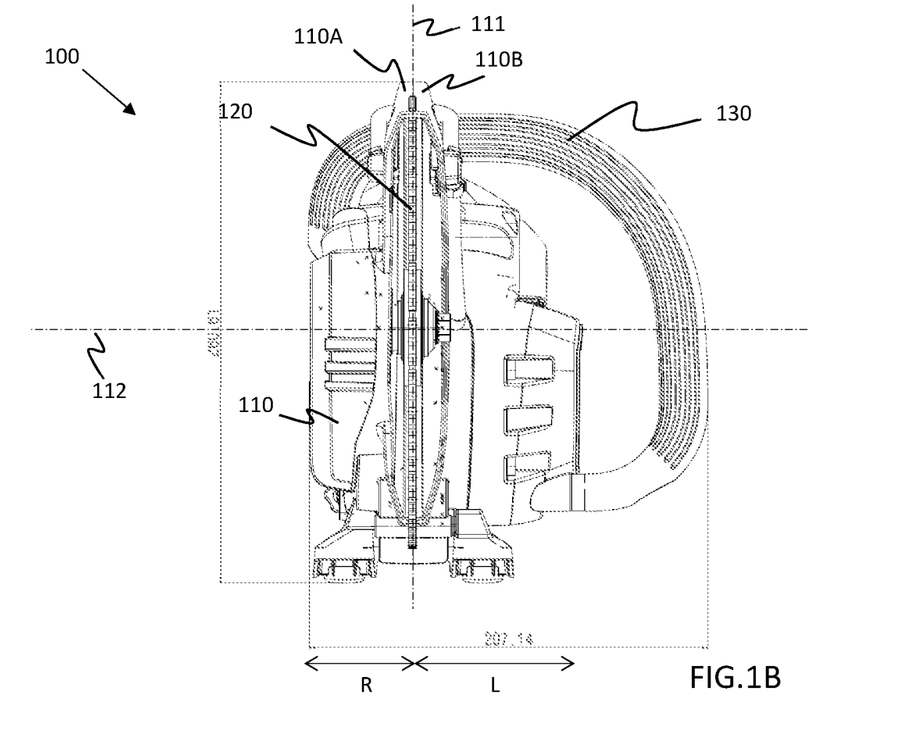
Figure 1C:
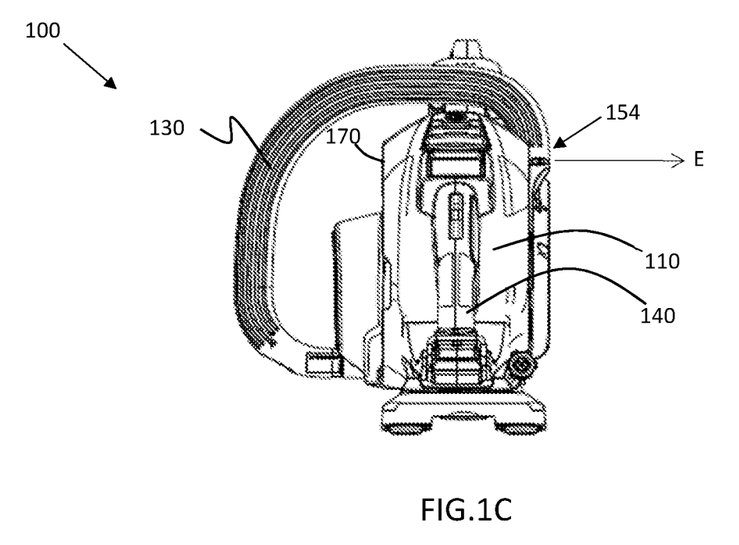
Figure 1D:
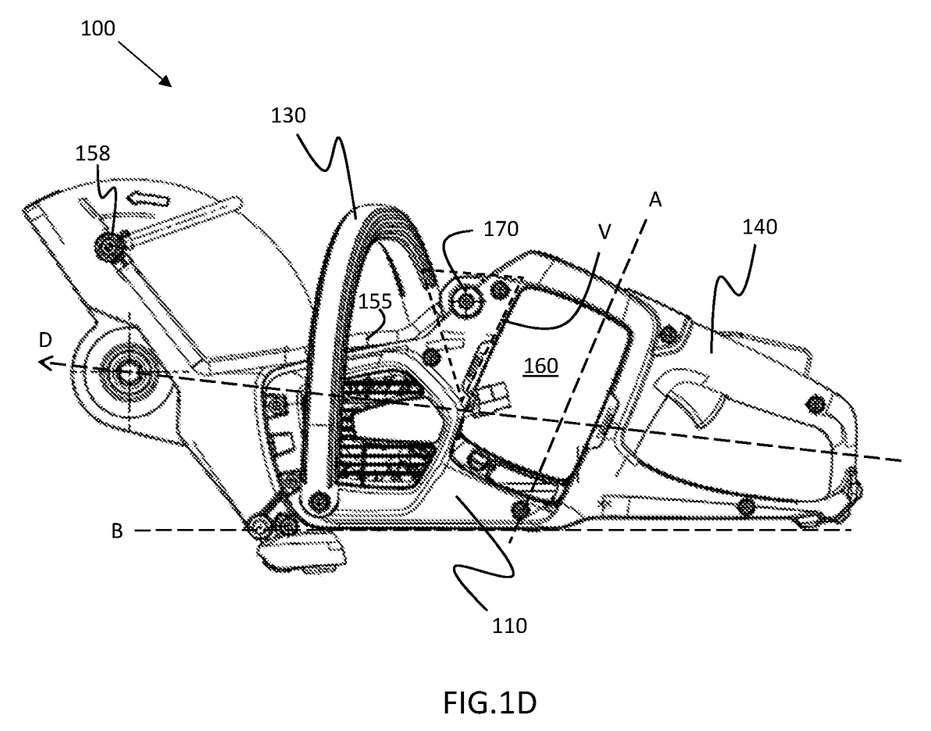

FIGS. 1A-1D show different views of a power tool 100 comprising a body 110 arranged to support a rotatable work tool 120 (not shown in FIGS. 1A-1D). FIGS. 1A and 1D show right and left side views, respectively. FIG. 1B shows a front view, and FIG. 10 shows a rear view.

The power tool illustrated in FIGS. 1A-1D is arranged to power a cut-off disc (not shown in FIGS. 1A-1D). An abrasive chain saw using the disclosed liquid dispensing system will be discussed below in connection to FIG. 5. As mentioned above, the disclosed liquid dispensing systems are applicable to a wide range of different power tools other than cut-off saws and chain saws.

The body 110 comprises a front handle 130 and a rear handle 140. The power tool has an elongate shape having an extension direction. The rear handle 140 is arranged at one end of this elongate shape, while the work tool 120 is arranged on an opposite end of the elongate shape. The front handle 130 is arranged between the rotatable work tool 120 and the rear handle 140 in the extension direction of the power tool.

Figure 2A:
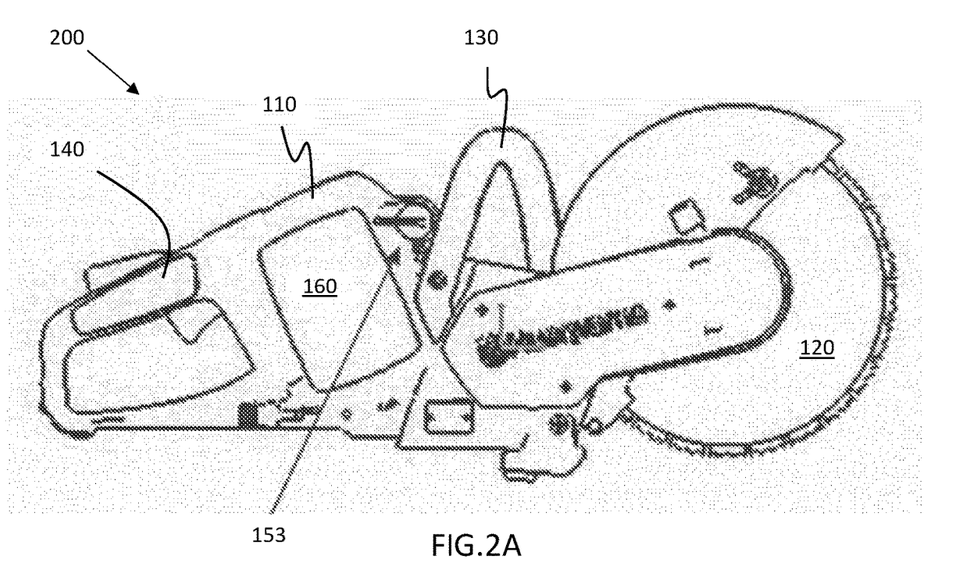
FIGS. 2A-2B schematically show a power tool with a liquid dispensing system.
Figure 2B:
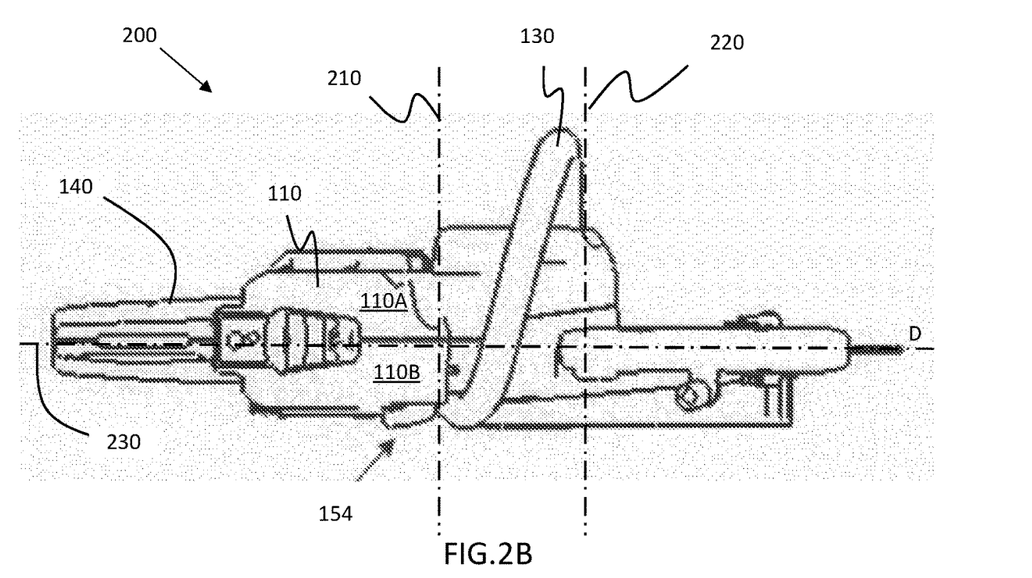
Figure 5:
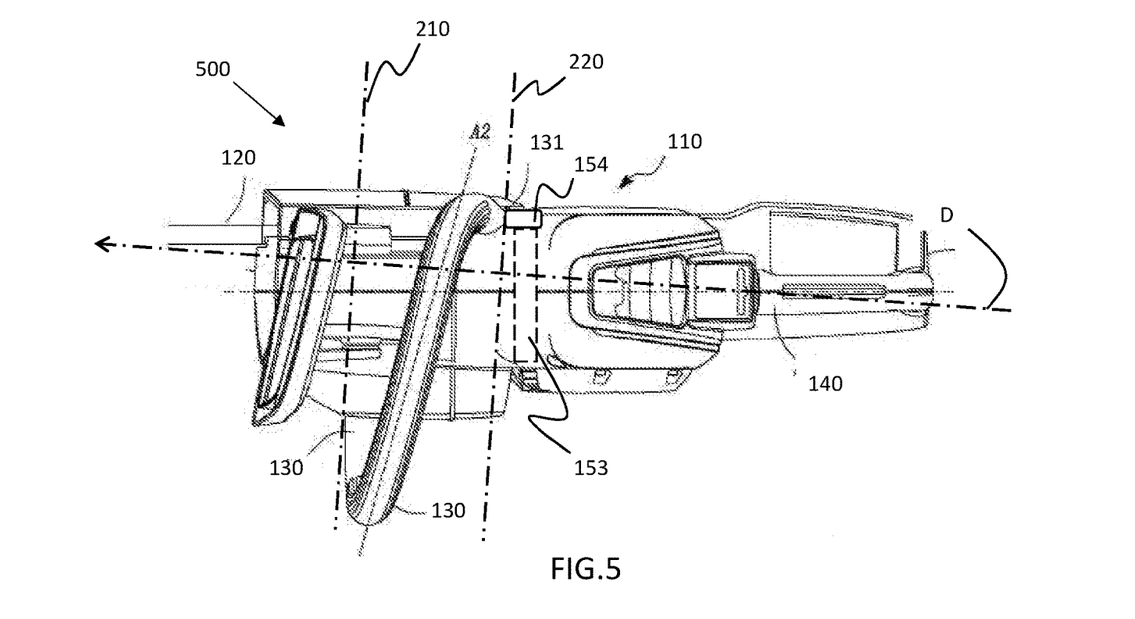
FIG. 5 schematically shows a power tool with a liquid dispensing system.

The power tools discussed herein, with reference also to FIG. 2B and FIG. 5, have elongated shapes extending from a tip or extreme point of the rotatable tool 120 to an opposite tip or extreme point of a rear handle 140. The extension direction of a power tool is the direction associated with maximum extension of the elongated shape. For example, the power tool illustrated in FIGS. 1A-1D is associated with an extension direction D extending from the rear handle 140 to the rotatable work tool forward edge. The chainsaw illustrated in FIG. 5 is associated with an extension direction extending from the rear handle to the tip of the guide bar.

Herein, again with reference also to FIG. 2B and FIG. 5, that 'the front handle 130 is, according to some aspects, arranged between the rotatable work tool 120 and the rear handle 140 in the extension direction of the power tool' means that the front handle is arranged in a volume delimited by first and second planes 210, 220 orthogonal to the extension direction D, such that at least part of the rear handle 140 is arranged on one side of the first and the second plane, and at least part of the rotatable work tool 120 is arranged on the other side of the first and the second plane.

The front handle 130 may advantageously be arranged close to a balancing point of the power tool approximately midway between the rear handle and the work tool. Control means 141, such as a trigger or throttle control, for controlling the power tool are arranged in connection to the rear handle 140.

According to some other aspects, the front aspect is the handle arranged furthest away from the rotatable tool, i.e., handle 140 in the figures. According to these aspects the control member is operable by a hand gripping handle 140. Normally, this is the right hand of an operator.

The power tool 100 comprises a liquid dispensing system 151, 152, 153, 155 for adding a controlled amount of liquid to the rotatable work tool. Liquid enters the dispensing system via an input connection 151 and is then led via a conduit 152 towards a valve 153. The valve 153 constitutes a means for adjusting a flow of liquid in the liquid dispensing system. Notably, the valve comprises a control member 154 arranged on the body and adjacent to the front handle such that the control member is operable by a hand gripping the front handle. A further conduit 155 is connected to the valve to feed liquid onwards and towards the tool 158.

According to some aspects, the liquid dispensing system comprises a conduit 152, 155, 157 for transporting liquid to the rotatable work tool 120, wherein at least part of the conduit 152, 157 is arranged embedded in the body 110. By embedding the conduit in the body, the conduit is protected from external objects, and is also prevented from snagging, which is an advantage.

According to some other aspects, the liquid dispensing system comprises a conduit 152, 155, 157 for transporting liquid to the rotatable work tool 120, wherein at least part of the conduit 152, 157 is arranged releasably embedded in the body 110. It is especially advantageous if the part of the conduit connected to the input connection 151 is arranged releasably embedded the body, since it is easier to connect a pressurized hose to the input connection if the input connection is not fixedly attached to the body 110. The operator can then remove the conduit from the embedded position, connect the pressurized hose, and then replace the conduit back in the embedded position.

According to further aspects, a section of the conduit 157 for transporting liquid to the rotatable work tool 120 is arranged covered by the front handle 130 or covered by a fitting element 131 of the front handle. This way the conduit is shielded from debris and other objects which may otherwise damage the conduit and cause leakage. FIG. 1A illustrates this covering by a fitting element 131 of the front handle 130. The conduit 152 is shown entering under the fitting 131, where it is protected, e.g., from impacts by external objects.

Various types of liquid can be used with the liquid dispensing system, plain water being one example.

Differently from U.S. Pat. No. 9,221,111 B2, which describes a control member arranged adjacent to the rear handle that cannot be controlled during operation, the present control member is operable by a hand gripping the front handle, which is an advantage. Thus, an operator holding the front handle may safely and conveniently extend, e.g., a thumb to operate the control member without interrupting the cutting operation. This makes it easier to optimize the flow level in the liquid dispensing system, since the effect of the liquid can be monitored during actual cutting.

Differently from U.S. Pat. No. 9,604,297 B2 which describes a control member arranged on the front handle, the present control member is arranged on the body adjacent to the front handle, and not on the front handle. This way space on the front handle is not taken up by the control member, and the control member is less exposed to impacts from external objects since it is at least partly shielded by the front handle.

FIG. 1B shows a front view of the power tool 100. It is noted that the body comprises first and second halves 110A, 110B. The rotatable work tool 120 is associated with a rotation plane 111 and has a rotation axis extending in a direction 112 orthogonal to the rotation plane 111 of the work tool. In the embodiment illustrated in FIG. 1A and FIG. 1B, the control member is arranged behind the front handle 130 when seen from the rotatable tool, i.e., in the view of FIG. 1B. This is an advantage since the control member is protected from impacts and mechanical wear by the front handle 130.

Herein, 'arranged adjacent to' is, according to some aspects, to be interpreted as being located close enough to be operable by the same hand that is gripping or holding the front handle. A valve located a few centimeters from the rear handle is not located adjacent to the front handle in FIG. 1A.

According to aspects, the control member 154 is arranged within 5 cm of the front handle 130 and preferably within 2 cm of the front handle 130. Thus, according to an example, 'adjacent to' means being located within 5 cm of the front handle. According to another example, 'adjacent to' means being located within 2 cm of the front handle. The distance measurements can be defined as the smallest distance measurable between a point on the front handle and a point on the control member.

According to aspects, the control member 154 is arranged adjacent to the front handle 130 in direction of the rear handle 140 and away from the work tool 120. In FIG. 1B the control member 154 cannot be seen, because it is 'hidden' behind the front handle 130. The front handle therefore protects the control member from impacts by objects in the direction of the work tool.

According to aspects, the control member 154 is arranged in front of the front handle 130 in direction of the rotatable tool 120. This placement of the control member is disadvantageous in that the control member is somewhat more exposed. However, the placement may be beneficial for other reasons, e.g., due to space constraints or the like.

The valve arrangement comprises a locking nut 170, shown in FIG. 1D. When the locking nut 170 is removed, the control valve 153 can be extracted from the body in a direction E, shown in FIG. 10. It is an advantage that the valve is conveniently accessible for maintenance and inspection without having to dismantle other parts of the body 110.

In other words, according to aspects, the valve portion 320 is arranged dismantable in the through hole, such that the valve 153 can be dismantled without disassembling other parts of the body 110. One example of a valve which can be arranged dismantable in the through hole is described in U.S. Pat. No. 9,604,297 B2. The through hole may be cylindrically shaped, in which case a correspondingly shaped valve can be fitted in the through hole. However, the through hole can also be configured with, e.g., a square cross-section to receive a corresponding square cross-section valve arrangement.

According to aspects, the body comprises a first half 110A and a second half 110B, wherein the through hole 310 passes through the first and second halves. The halves are indicated in FIG. 1B.

According to aspects, the control member 154 is arranged on a right-hand side R of the body 110 seen from the rear handle. This way the control member is reachable by, e.g., a thumb of an operators left hand holding the front handle 130.

According to aspects, an indicator arrangement 156 is arranged in connection to the valve 153, the indicator arrangement is configured to indicate a current flow of liquid in the dispensing system. The indicator arrangement may, e.g., be a printed scale on the body, so that a position of a control member lever is indicated, or it can be a diode arrangement providing a more advanced flow level indication. A display can also be configured on the body and arranged to provide information associated with a current flow level setting of the valve. According to some aspects, one or more pre-configured flow levels are selectable. The operator can then simply indicate a preferred flow setting corresponding to a given material or cutting scenario.

According to aspects, the lever is pivotably arranged around an axis extending essentially orthogonally with respect to an extension direction of the power tool, and essentially parallel to a rotation axis of the rotatable work tool 120. This particular orientation of a control member lever is advantageous in that it provides for a more comfortable thumb action control of the lever.

According to aspects, the power tool is an electrically powered tool comprising a battery compartment 160 arranged between the front handle 130 and the rear handle 140. The valve 153 and the control member 154 are arranged between the battery compartment 160 and the front handle 130.

With reference again to FIG. 1A, the battery compartment 160 is in some embodiments arranged inclined A at an angle with respect to a baseline B of the power tool, thereby defining a wedge-shaped volume V between the front handle and the battery compartment, wherein the valve 153 is arranged in the wedged shaped volume.

FIGS. 2A and 2B illustrate another cut-off power tool 200 comprising the improved liquid dispensing system. Here an example rotatable work tool 120 is shown.

Figure 3:
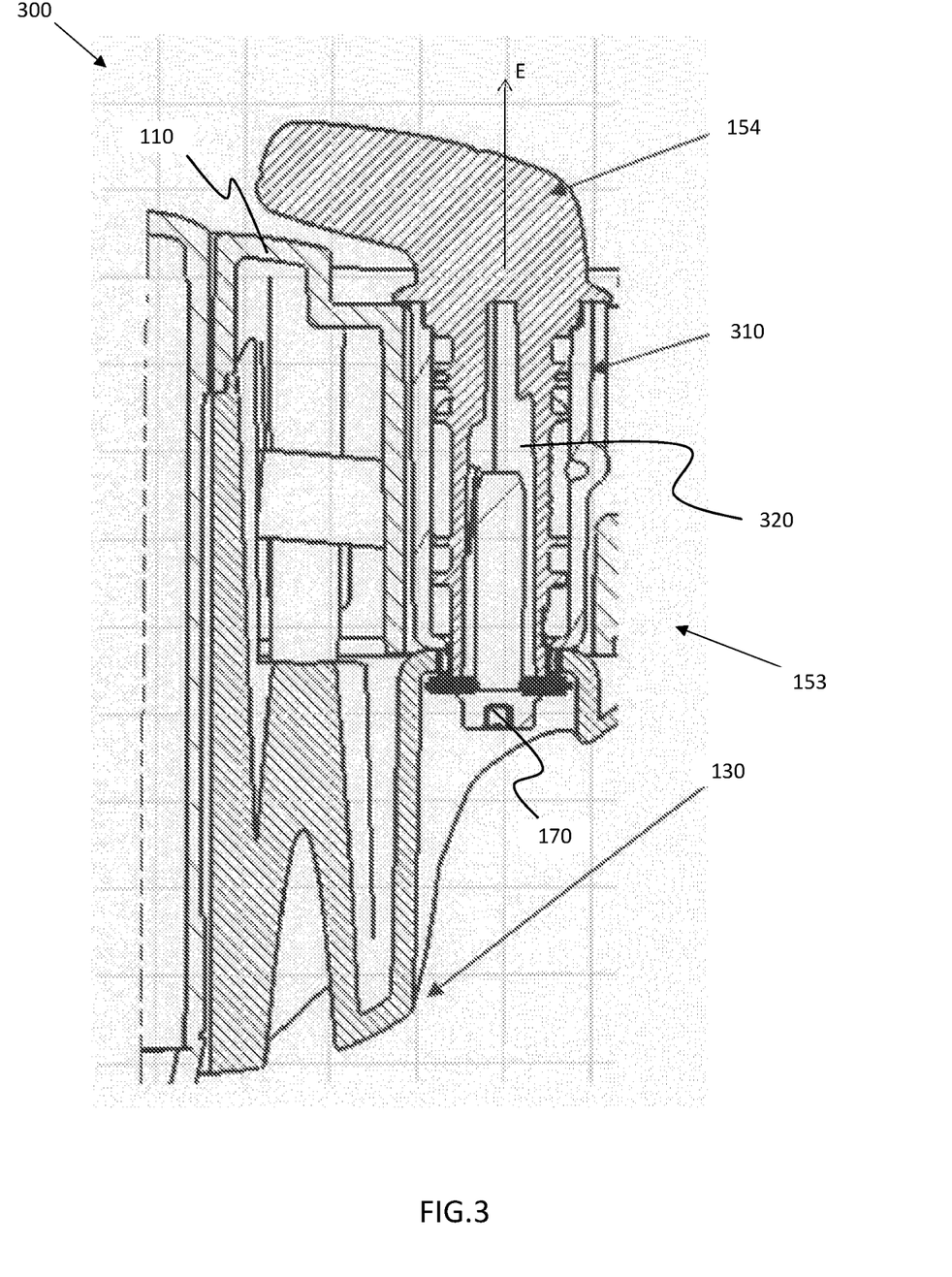
FIG. 3 shows an example valve and a control member.

FIG. 3 illustrates details of a power tool 300, and in particular shows example details of the valve 153. It is noted that the valve extends through body 110. Thus, a through-hole 310 is formed in the body 110, and the valve 153 comprises a valve portion 320 arranged in the though hole. The through hole is, according to some aspects, cylindrical in shape. However, a square or rectangular cross-section through hole is also possible.

The locking nut 170 is also shown. When the locking nut 170 is removed, the valve arrangement can be extracted from the body in direction E. This allows for convenient cleaning and inspection of the valve arrangement.

Figure 4:
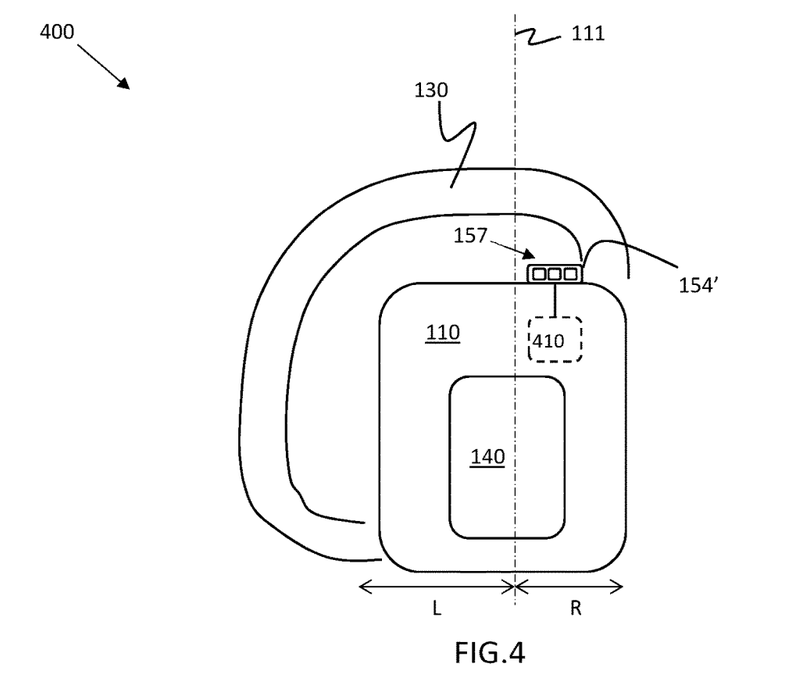
FIG. 4 shows a power tool with an example control member.

According to aspects, the control member 154 is a lever or handle configured to be operated by a thumb action, as exemplified in FIGS. 1A, 1B, 2A, and 2B. However, as shown in FIG. 4, the valve may also be an electrical valve, and the control member 154' may comprise one or more buttons 157 arranged to control the electrical valve. The buttons may, e.g., be configured for increasing and decreasing a flow level, and for turning on and off the flow.

According to further aspects, the control member may comprise a control wheel. The flow in the liquid dispensing system is then controlled by turning the wheel in one direction to increase flow an in another direction to decrease flow.

In case of an electrical control member, i.e., a button arrangement or electrical wheel arrangement or the like. A control circuit 410 can be connected to the control member and arranged to control the valve 153. The control circuit 410 is illustrated in FIG. 4.

FIG. 5 illustrates a chain saw 500 arranged for abrasive operation. The chain saw comprises rear 140 and front 130 handles. The control member 154 is again arranged adjacent to the front handle 130, such that the control member is operable by a hand gripping the front handle.

The chain saw comprises a sprocket for driving the chain. This sprocket has a rotation axis which is parallel with a rotation axis of the rotatable work tool. Consequently, the lever referred to above is here pivotably arranged around an axis extending essentially orthogonally with respect to an extension direction of the power tool, and essentially parallel to a rotation axis of the sprocket.

Figure 6:
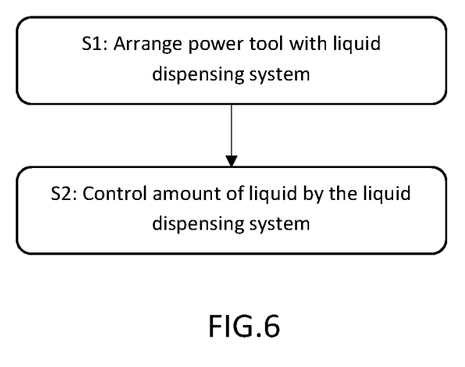
FIG. 6 is a flow chart illustrating methods.

FIG. 6 is a flow chart illustrating methods. There is illustrated a method for controlling an amount of liquid added to a rotatable work tool during operation of a power tool 100, 200, 400, the power tool comprising a body 110 arranged to support the rotatable work tool 120, the body comprising a front handle 130 and a rear handle 140, wherein the front handle is arranged between the rotatable work tool and the rear handle, the method comprises;

arranging S1 the power tool to comprise a liquid dispensing system 151, 152, 153, 155 for adding a controlled amount of liquid to the rotatable work tool, the liquid dispensing system comprising a valve 153 for adjusting a flow of liquid in the liquid dispensing system, wherein the valve comprises a control member 154, 154' arranged on the body and adjacent to the front handle, and controlling S2 the amount of liquid by operating the control member 154, 154' with a hand which is simultaneously gripping the front handle 130.

The methods describe actions which are associated with the above-mentioned aspects of the power tool.

The invention claimed is:

1. A power tool comprising a body arranged to support a rotatable work tool rotatable about an axis of rotation, the body comprising a front handle and a rear handle, the power tool comprising a liquid dispensing system for adding a controlled amount of liquid to the rotatable work tool, the liquid dispensing system comprising a valve for adjusting a flow of liquid in the liquid dispensing system, wherein the valve is configured to be controlled by a control member arranged on a portion of the body at which at least part of a conduit transporting the liquid to the rotatable work tool is embedded in the body and separate from the front handle, but adjacent to the front handle such that the control member is operable by a hand gripping the front handle, wherein the power tool is an electrically powered tool comprising a battery compartment arranged between the front handle and the rear handle, wherein the valve and the control member are arranged between the battery compartment and the front handle, wherein the axis of rotation is contained in a plane disposed parallel to a baseline of the power tool, and wherein the valve and the control member are disposed immediately proximate to one another on a same side of the plane as a majority of the front handle in a wedge-shaped volume between the front handle and the battery compartment.

2. The power tool according to claim 1, wherein the control member is arranged within 5 cm of the front handle.

3. The power tool according to claim 1, wherein the control member is arranged adjacent to the front handle in a direction of the rear handle and away from the work tool.

4. The power tool according to claim 1, wherein the control member is arranged on a right-hand side of the body seen from the rear handle.

5. The power tool according to claim 1, wherein an indicator arrangement is arranged in connection to the valve, the indicator arrangement being configured to indicate a current flow level of liquid in the dispensing system.

6. The power tool according to claim 1, wherein the control member is a lever configured to be operated by a thumb action.

7. The power tool according to claim 6, wherein the lever is pivotably arranged around an axis extending essentially orthogonally with respect to an extension direction of the power tool, and essentially parallel to a rotation axis of the rotatable work tool.

8. The power tool according to claim 1, wherein the valve is an electrical valve, and wherein the control member (154') comprises one or more buttons arranged to control the electrical valve.

9. The power tool according to claim 1, wherein a through-hole is formed in the body, wherein the valve comprises a valve portion arranged in the through hole.

10. The power tool according to claim 9, wherein the valve portion is arranged dismantable in the through hole, such that the valve can be dismantled without disassembling other parts of the body.

11. The power tool according to claim 9, wherein the body comprises a first half and a second half, wherein the through hole passes through the first and second halves.

12. The power tool according to claim 1, wherein the liquid dispensing system comprises a conduit for transporting liquid to the rotatable work tool, wherein at least part of the conduit is arranged embedded in the body.

13. The power tool according to claim 1, wherein the liquid dispensing system comprises a conduit for transporting liquid to the rotatable work tool, wherein at least part of the conduit is arranged releasably embedded in the body.

14. The power tool according to claim 12, wherein a section of the conduit for transporting liquid to the rotatable work tool is arranged covered by the front handle or covered by a fitting element of the front handle.

15. The power tool according to claim 1, wherein the front handle is arranged between the rotatable work tool and the rear handle in an extension direction of the power tool.

16. A method for controlling an amount of liquid added to a rotatable work tool during operation of a power tool, the power tool comprising a body arranged to support the rotatable work tool rotatable about an axis of rotation, the body comprising a front handle and a rear handle, wherein the front handle is arranged between the rotatable work tool and the rear handle, the method comprising;

arranging the power tool to comprise a liquid dispensing system for adding a controlled amount of liquid to the rotatable work tool, the liquid dispensing system comprising a valve for adjusting a flow of liquid in the liquid dispensing system, wherein the valve comprises a control member arranged on a portion of the body at which at least part of a conduit transporting the liquid to the rotatable work tool is embedded in the body and separate from the front handle, but adjacent to the front handle, and controlling the amount of liquid by operating the control member with a hand which is simultaneously gripping the front handle, wherein the power tool is an electrically powered tool comprising a battery compartment arranged between the front handle and the rear handle, wherein the valve and the control member are arranged between the battery compartment and the front handle, wherein the axis of rotation is contained in a plane disposed parallel to a baseline of the power tool, and wherein the valve and the control member are disposed immediately proximate to one another on a same side of the plane as a majority of the front handle in a wedge-shaped volume between the front handle and the battery compartment.

17. A power tool comprising a body arranged to support a rotatable work tool, the body comprising a front handle and a rear handle, the power tool comprising a liquid dispensing system for adding a controlled amount of liquid to the rotatable work tool, the liquid dispensing system comprising a valve for adjusting a flow of liquid in the liquid dispensing system, wherein the valve is configured to be controlled by a control member arranged on a portion of the body at which at least part of a conduit transporting the liquid to the rotatable work tool is embedded in the body and separate from the front handle, but adjacent to the front handle such that the control member is operable by a hand gripping the front handle, wherein the power tool is an electrically powered tool comprising a battery compartment arranged between the front handle and the rear handle, wherein the valve and the control member are arranged between the battery compartment and the front handle, wherein the battery compartment is arranged inclined at an angle with respect to a baseline of the power tool, thereby defining a wedge-shaped volume between the front handle and the battery compartment, and wherein the valve and the control member are disposed immediately proximate to one another in the wedge-shaped volume and on a same side of a plane of the power tool wherein a majority of the front handle is located.

* * * * *